United States Patent
Clark et al.

(10) Patent No.: US 6,373,839 B1
(45) Date of Patent: Apr. 16, 2002

(54) BANDWIDTH BIASED CODEC SELECTION SYSTEM AND METHOD

(75) Inventors: Mark Clark; Eddie Lo, both of San Jose, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/467,550

(22) Filed: Dec. 10, 1999

(51) Int. Cl.[7] .............................................. H04L 12/66
(52) U.S. Cl. ...................... 370/352; 370/263; 370/435; 709/247; 709/228; 709/227
(58) Field of Search .................... 370/352, 260–267, 370/419; 522/401; 490/311; 263/216; 435/385, 465–468; 379/167.05, 229, 88.17–93.14, 269; 455/462–466, 524, 557–567, 414–418, 403, 412, 458; 709/247, 227–228, 236

(56) References Cited

U.S. PATENT DOCUMENTS

| 5,546,398 A | 8/1996 | Sharma et al. |
| 5,657,358 A | 8/1997 | Penech et al. |
| 5,742,773 A | 4/1998 | Bloomfield-Brown et al. |
| 6,154,465 A | * 11/2000 | Pickett ........................ 370/466 |
| 6,185,288 B1 | * 2/2001 | Wong .......................... 370/352 |
| 6,289,025 B1 | * 9/2001 | Pang et al. .................. 370/458 |
| 6,292,840 B1 | * 9/2001 | Blomfield-Brown et al. ............... 709/247 |

OTHER PUBLICATIONS

U.S. application No. 09/118565, Shaffer et al., filed Jul. 17, 1998.

* cited by examiner

*Primary Examiner*—Wellington Chin
*Assistant Examiner*—Prenell Jones

(57) ABSTRACT

Endpoints, such as clients and gateways, maintain local codec priority lists (500), receive remote codes priority lists (504), and maintain common communication attribute priority lists (502). When opening a transmittal channel, a local endpoint determines the highest priority codec on its local priority list (500) that is also on the remote priority list (504). The local endpoint also determines the highest priority codec on the remote priority list (504) that is also on the local priority list (500). If the codes types match, then the transmitting channel is opened with that codec. If there is no match, then the common communication attribute priority list (502) is used, and the local or remote codec that has a corresponding highest or lowest desired attribute is used for the communication.

14 Claims, 5 Drawing Sheets

BANDWIDTH BIASED CODEC SELECTION SYSTEM AND METHOD

BACKGROUND OF THE INVENTION

Field of the Invention

The present invention relates to telecommunications systems, and in particular, to an improved telephony-over-local area network (LAN) system.

DESCRIPTION OF THE RELATED ART

The International Telecommunications Union (ITU) Recommendation H.323 defines a set of protocols for multimedia communication on packet networks. In particular, a protocol is described whereby endpoints can signal each other a list of their respective coding capabilities. However, the H.323 Recommendation does not specify the method by which an endpoint chooses from among those capabilities which are to be used in a particular connection.

In particular, according to conventional H.323 systems, each endpoint can only select the codec with which it will be transmitting, and only if the other endpoint has the capability of receiving using that selected coding scheme. Thus, it is possible for each endpoint to select a different codec, which can result in a sub-optimal network bandwidth usage. For example, a local endpoint on a low bandwidth LAN segment may place its lowest bandwidth codec first on its priority list. If the local endpoint starts a communication with a remote endpoint, and it is determined that the remote endpoint will support the low bandwidth codec, then the transmissions from the local endpoint will proceed using that codec. However, if the remote endpoint has a different priority list, for example, because it is on a higher bandwidth LAN segment, then the remote endpoint may attempt to transmit using its higher bandwidth codec. So long as the remote endpoint determines that the local client endpoint can support its codec choice, the higher bandwidth transmission will proceed. This results in sub-optimal network bandwidth usage as the higher bandwidth transmissions are being sent from the remote endpoint to the local endpoint which is on a low bandwidth LAN segment.

SUMMARY OF THE INVENTION

These and other drawbacks in the prior art are overcome in large part by a coding algorithm policy adjustment system according to the present invention. Endpoints according to the present invention maintain local codec priority lists, receive remote codec priority lists, and maintain common communication attribute priority lists. When opening a transmission channel, a local endpoint determines the highest priority codec on its local priority list that is also on the remote priority list. The local endpoint also determines the highest priority codec on the remote priority list that is also on the local priority list. If the codec types match, then the transmitting channel is opened with that codec. If there is no match, then the common communication attribute priority list is used, and the local or remote codec that has a corresponding highest or lowest desired attribute is used for the communication. According to one embodiment, the communication attribute is a bandwidth ranking. Other attributes, such as voice quality, may be prioritized in other embodiments.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–6 illustrate bandwidth biased codec system and method according to an embodiment of the invention. Advantageously, the present invention employs a common communication attribute ranking to bias codec selection to ensure that a codec having desired attributes is chosen.

Figure 1:
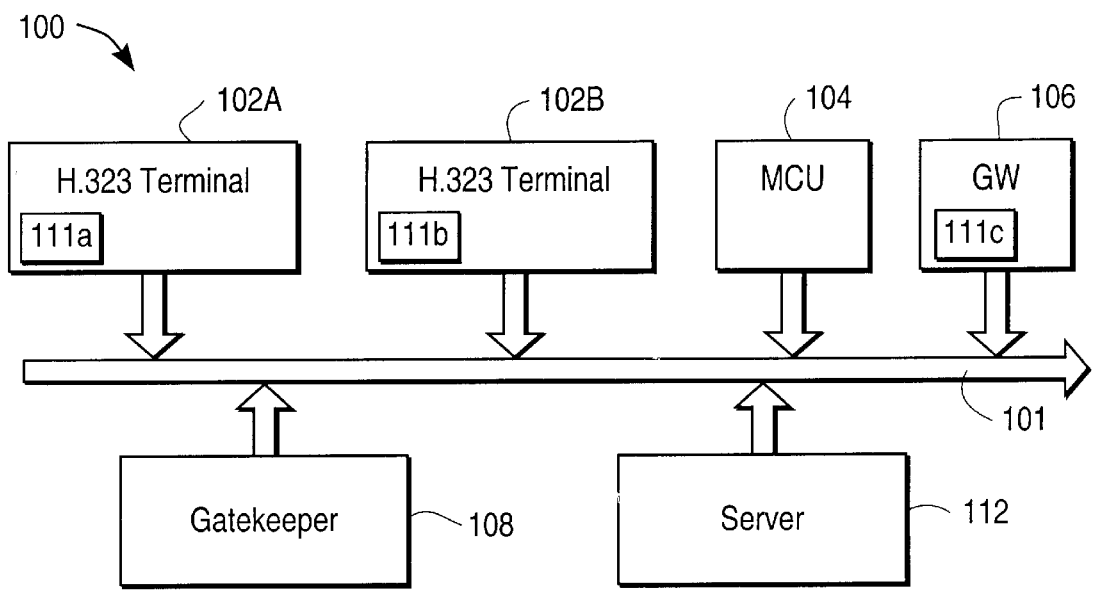
FIG. 1 is a diagram illustrating a telecommunications system according to an embodiment of the invention.

Turning now to the drawings and with particular attention to FIG. 1, a telecommunications system 100 according to an embodiment of the present invention is shown. In particular, according to the implementation illustrated, a;the telecommunications system 100 includes a local area network (LAN) or packet network 101. Coupled to the LAN 101 may be a variety of H.323 client terminals 102A, 102B, a multi-point control unit (MCU) 104, an H.323 gateway 106, an H.323 gatekeeper 108, a LAN server 112 and a plurality of other devices such as personal computers (not shown). The H.323 terminals 102A, 102B are in compliance with the H.323 standard. Thus, the H.323 terminals 102A, 102B support H.245 for negotiation of channel usage, Q.931 for call signaling and call setup, registration admission status (RAS), and RTP/RTCP for sequencing audio and video packets. The H.323 terminals 102A, 102B may further implement audio and video codecs, T.120 data conferencing protocols and MCU capabilities. Further details concerning the Recommendation H.323 may be obtained from the International Telecommunications Union (ITU); the Recommendation is hereby incorporated by reference in its entirety as if fully set forth herein. It is noted that "endpoints" includes client terminals and gateways.

In addition, the H.323 endpoints 102a, 102b and 106 include coding resources units 111a, 111b, 111c according to the present invention. As will be discussed in greater detail below, the coding resources units 111a, 111b, 111c are used during call setup to determine optimal codec selection according to the present invention.

Figure 2:
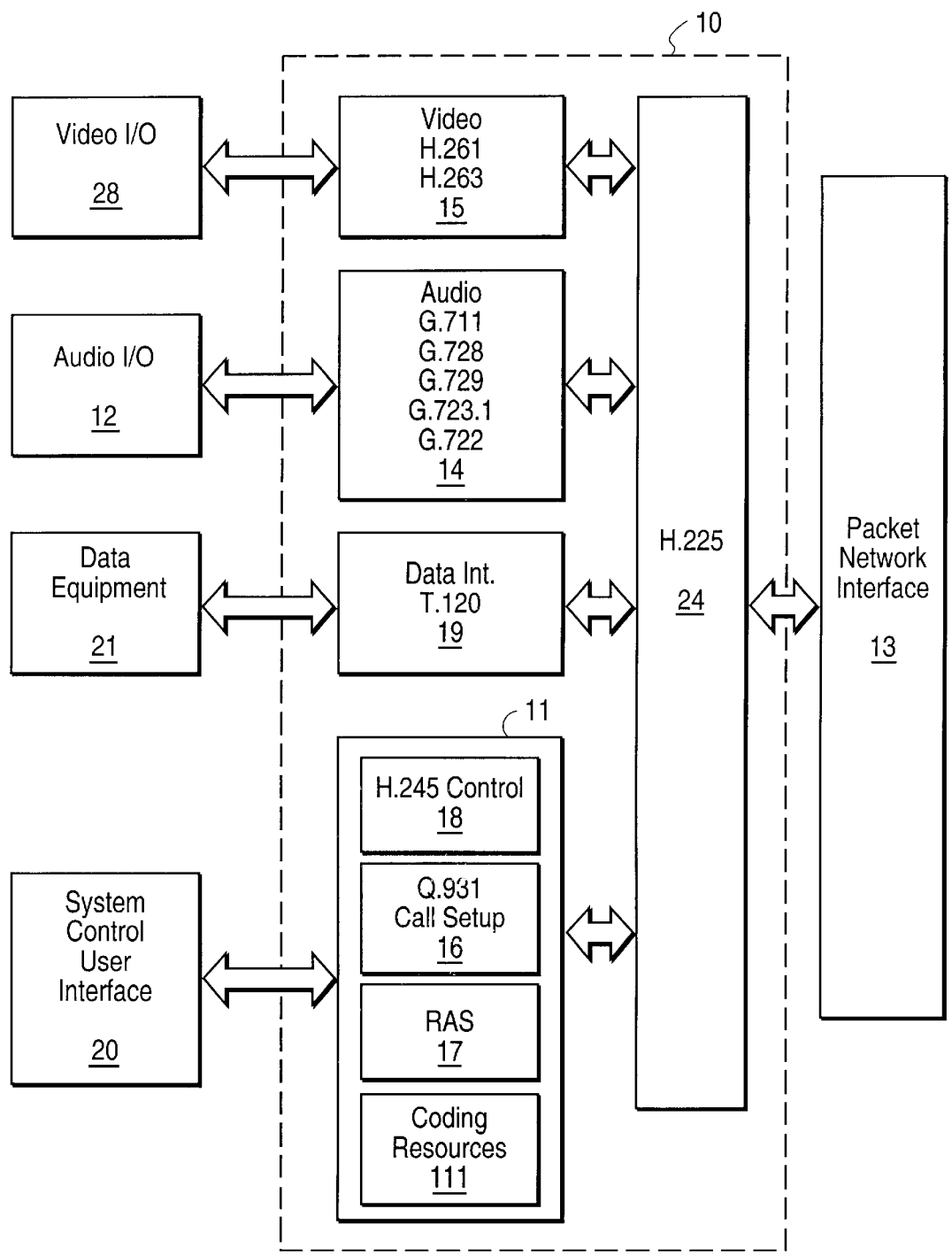
FIG. 2 is a diagram of an exemplary H.323 interface according to an embodiment of the invention.

A logical diagram of an H.323 interface to the LAN 101 is shown in FIG. 2, according to an embodiment of the present invention. The interface includes a known network terminal/device 10 utilizing the ITU-T H.323 protocol, and a packet network interface 13 that is coupled to network terminal 10. Network interface 13 couples the H.323 device to LAN 101. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The network terminal 10 is coupled to a video input/output (I/O) interface 28, an audio I/O interface 12, a data equipment 21 via a user application interface 19, and a system control user interface (SCUI) 20. Network terminal 10 also includes an H.225 layer 24, a video coder/decoder (codec) 15, an audio codec 14, and a control layer 11 that includes H.245 protocol functionality 18, Q.931 protocol functionality 16, RAS protocol functionality 17, and coding resources unit 111.

As seen in FIG. 2, the video I/O interface 28 which may be part of the standard H.323 device connects to the video codec 22 such as an H.261 codec for encoding and decoding video signals. Coupled between video I/O interface 28 and H.225 layer 24, video codec 22 translates encoded video signals to H.225 protocol signals. Although the H.261 codec can be the video codes used for an H.323 terminal, other video codecs, such as H.263 codecs and others, may also be used for encoding and decoding video. The H.245 protocol is used to exchange terminal capability information such as the video coding algorithm. Generally, the called terminal specifies its capabilities to the calling terminal.

Audio I/O interface 12, which may be part of a standard H.323 terminal, connects to the audio codec 14, such as a G.711 codec, for encoding and decoding audio signals. Coupled to audio I/O interface 12, audio codec 14 is coupled to H.225 layer 24 and translates audio signals to H.225 protocol signals. Although the G.711 codec is the mandatory audio codec for an H.323 terminal, other audio codecs, such as G.728, G.729, G.723.1, G.722, MPEG1 audio, etc. may also be used for encoding and decoding speech, in accordance with the present invention. G.723.1 typically is a preferred codec because of its reasonably low bit rate, which enables preservation of link bandwidth, particularly in slower speed network connections. As is known, when communicating, H.323 terminals use a common coding algorithm or codec supported by all entities to the conversation/conference. This information is exchanged during an H.245 capability exchange phase.

The control layer 11 interfaced with SCUI 20 provides signaling and flow control for proper operation of the H.323. terminal. In particular, all nonaudio and non-video control signaling is handled via SCUI 20. Coupled to SCUI 20 in the control layer 11 are H.245 layer 18, Q.931 layer 16 and RAS layer 17, which couple to H.225 layer 24. Thus, SCUI 20 interfaces to the H.245 standard which is the media control protocol that allows capability exchange, channel negotiation, switching of media modes and other miscellaneous commands and indications for multimedia communications. SCUI 20 also interfaces to the Q.931 protocol which defines the setup, teardown, and control of H.323 communication sessions. SCUI 20 further interfaces to the Registration, Admission, Status (RAS) protocol that defines how H.323 entities can access H.323 gatekeepers to perform among other things address translation, thereby allowing H.323 endpoints to locate other H.323 ondpoints via an H.323 gatekeeper. The H.225 standard layer 24, which is derived from the Q.931 standard, is the protocol for establishing connection between two or more H.323 terminals and also formats the transmitted video, audio, data and control streams into messages for output to the network interface 13 (e.g., transport over IP network 101). The H.225 layer 24 also retrieves the received video, audio, data and control streams from messages that have been input from network interface 50.

In addition, in accordance with the present invention, the H.323 terminal's control layer 11 may also include a coding resources unit 111 which is used to bias a codec choice according to the present invention, as will be described further below. User application interface 19, which may be a T.120 protocol interface as well as other types of protocol interfaces, also is coupled between H.225 layer 24 and a user device 21, which may be for example data equipment. Thus, an H.323 network may be configured to include several different devices. For example, the network may include a terminal for enabling users connected to a LAN to speak, a terminal (i.e., gateway) for enabling a caller resident on the LAN to call a second user through the public switched network, and/or a terminal for enabling the adapter to communicate through a wireless trunk, using a wireless telephone. The device may also implement supplementary services according to the H.450 protocol specification.

The H.323 gateway 106 (FIG. 1) generally provides a translation function between H.323 conferencing endpoints and other terminal types and performs call setup and clearing on both the LAN side and switched circuit network (e.g., public switched telephone network or PSTN) side. The H.323 gatekeeper 108 performs address translation from LAN aliases for terminals and gateways to IP or IPX addresses (as defined in the RAS specification) as well as bandwidth management (also specified within the RAS specification). The H.323 gatekeeper 108 may further be used for call routing.

Figure 3:
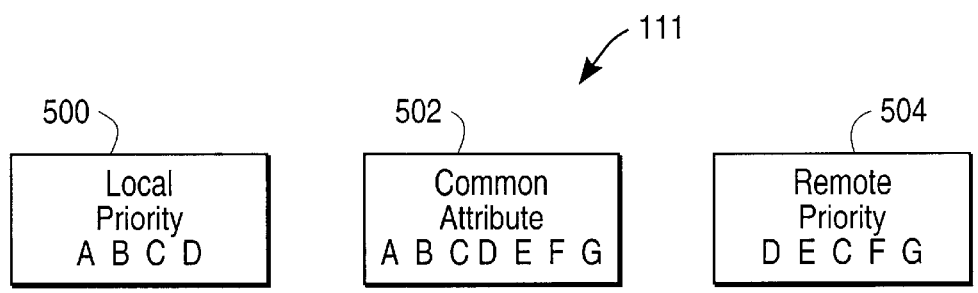
FIG. 3 is a diagram illustrating an exemplary coding resources unit according to an embodiment of the invention.

An exemplary coding resources unit in an endpoint is shown in FIG. 3. As shown, the coding resources unit 111 includes a local priority unit 500, a common attribute unit 502, and a remote priority unit 504 accessible by a processor (not shown), The local priority unit 500 may be embodied as memory for storing a prioritized list of codec choices for the local endpoint. As shown, the local priority unit 500 lists codecs A, B, C, and D, in order of priority. Similarly, the remote priority unit 504 may be embodied as a memory device for receiving and storing a codec priority list for the remote endpoint. As shown, the remote priority unit 504 lists codecs D, E, C, F, and G in order of priority. Finally, the common attribute unit 502 stores a list of available codecs (A, B, C, D, E, F, and G) according to a predetermined attribute. For example, the codecs might be ranked in order of bandwidth usage or in order of speech quality.

In operation, when opening a transmission channel, a local endpoint determines the highest priority codes on its local priority list 500 that is also on the remote priority list 504. For example, as shown in FIG. 3, the local priority unit 500 determines that codec C matches. The local client endpoint also determines the highest priority codec on the remote priority list 504 that is also on the local priority list 502 (codec D). If the codec types match, then the transmitting channel is opened with that codec. In the example shown, there is no match, so the common communication attribute priority list 502 is used. The determined local codec (codes C) or determined remote codec (codec D) that has a corresponding highest (or lowest in some embodiments) desired attribute is used for the communication. In this case, as shown, codec C is chosen.

Figure 4:
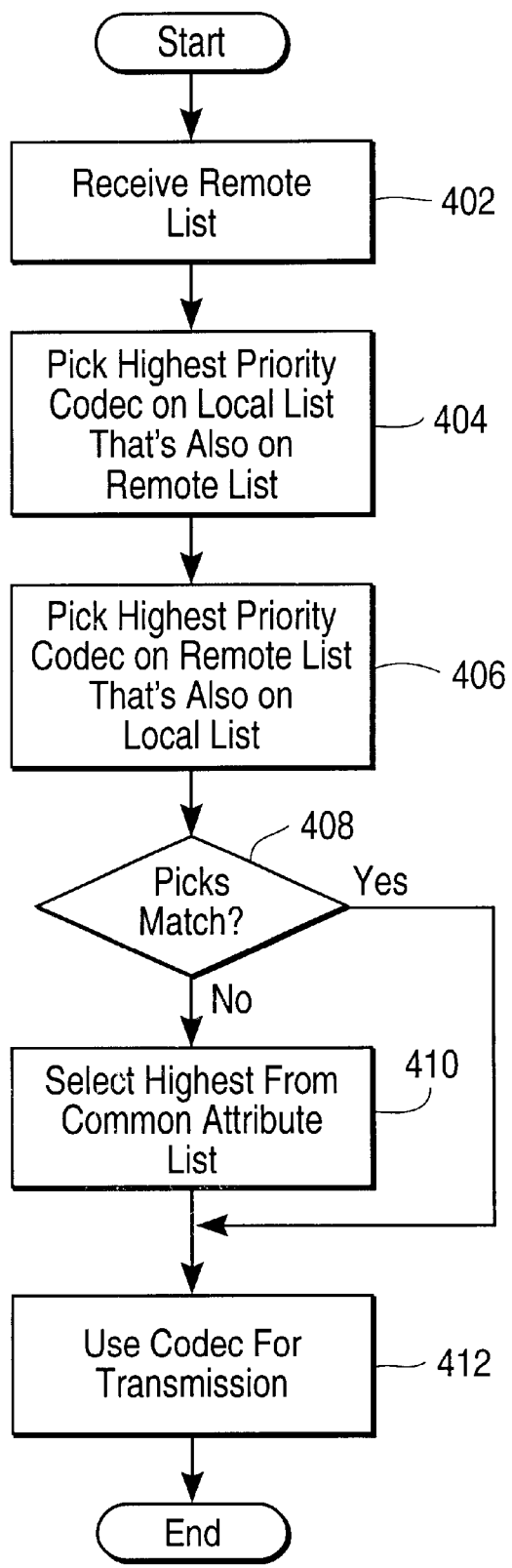
FIG. 4 is a flowchart illustrating operation of an embodiment of the invention.
Figure 5:
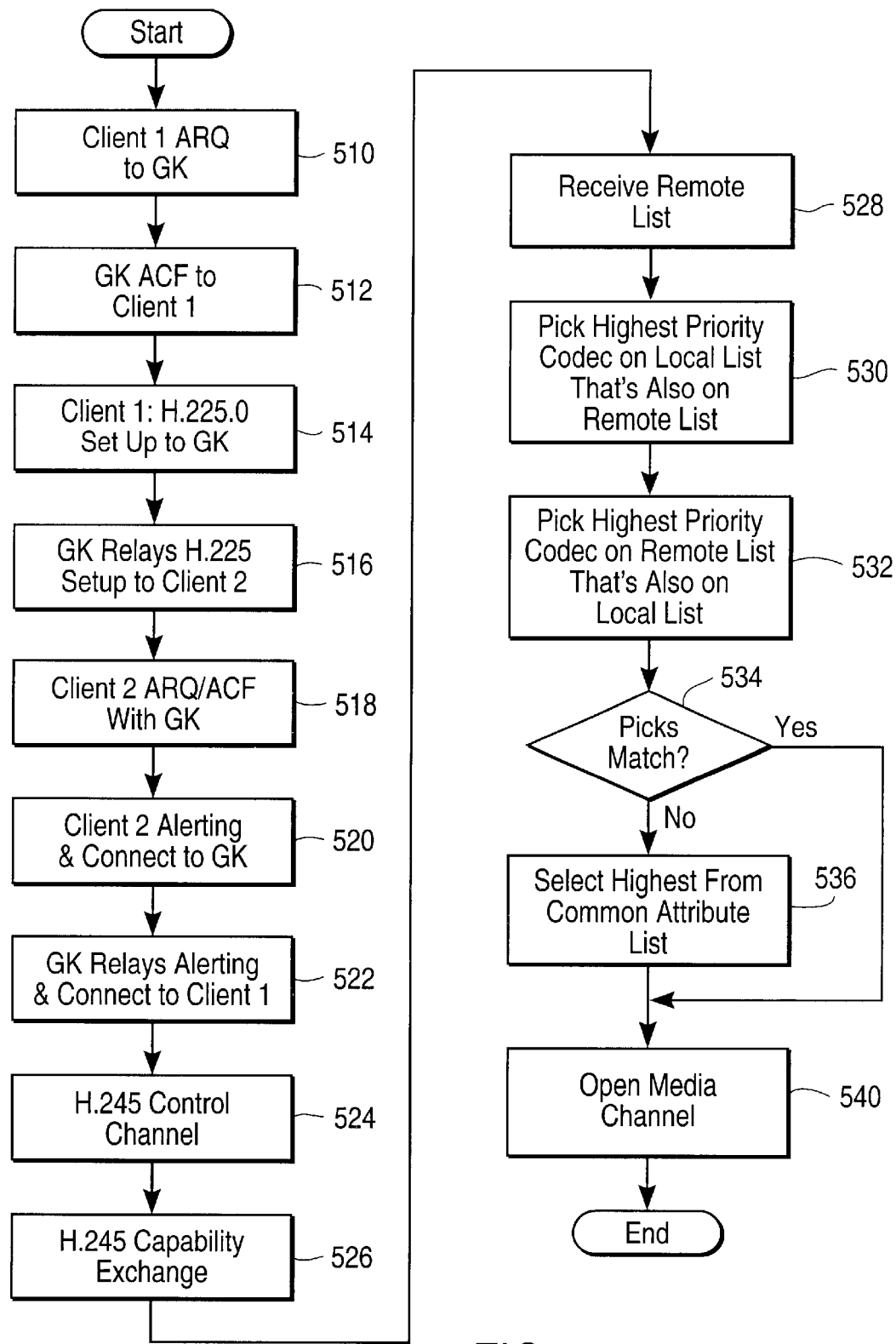
FIG. 5 is a flowchart illustrating operation of an embodiment of the invention.

As an example, a flowchart illustrating operation of one embodiment of the invention is shown in FIG. 4. In a step 402, at the beginning of call setup, the local endpoint receives the remote priority list. The system then accesses the local priority list and, in a step 404, the system determines the highest priority codec on the local list that is also on the remote list. In a step 406, the system accesses the remote list and determines the highest priority codec on the remote list that is also on the local list. In step 408, the system determines whether the codecs match. If so, communication is begun with the codec. If not, then in a step 410, the system accesses the common attribute list to select the highest priority of the two codecs. Finally, in a step 412, the communication is undertaken with the selected codec.

As discussed above, one application of the present invention is in H.323 systems. In particular, with reference to FIG. 5, in a step 510, an endpoint (e.g., Client 1) wants to establish a call to another endpoint (e.g., Client 2). The endpoint Client 1 sends an ARQ message (AdmissionRequest) to the gatekeeper GK. The gatekeeper GK responds with an ACF (AdmissionConfirm) message to endpoint Client 1, in a step 512. The ACF message includes a Call Signaling Transport Channel Address of the gatekeeper GK. In a step 514, in response to the ACF message, the endpoint Client 1 sends an H.225.0 setup message to the gatekeeper GK.

In a step 516, the gatekeeper GK relays the H.225.0 setup message to the endpoint Client 2. In response, in a step 518, the endpoint Client 2 conducts an ARQ/ACF exchange with the gatekeeper GK. In a step 520, the endpoint Client 2's sends H.225.0 Alerting and Connect messages to the gatekeeper GK as the call progresses to the connect state. The gatekeeper GK, in turn provides the Alerting and Connect messages to the endpoint Client 1 In a step 522. The Alerting or Connect message includes the Gatekeeper H.245 Control Channel Transport Address, which is used, in a step 524, to establish the H.245 control channel. Next, an H.245 capability exchange is undertaken, in a step 526. According to the present invention, the local endpoint Client 1 receives the remote priority list, in a step 528. Endpoint Client 1 then accesses the local priority list and, in a step 530, determines the highest priority codec on the local list that is also on the remote list. In a step 532, endpoint Client 1 accesses the remote list and determines the highest priority codec on the remote list that is also on the local list. In step 534, endpoint Client 1 determines whether the codecs match. If so, communication is begun with the codec in step 538. If not, then in a step 530, endpoint Client 1 accesses the common attribute list to select the highest priority of the two codecs. Finally, in a step 538, the communication is undertaken with the selected codec, i.e., the media channel is opened. A similar procedure is undertaken at endpoint Client 2.

Figure 6:
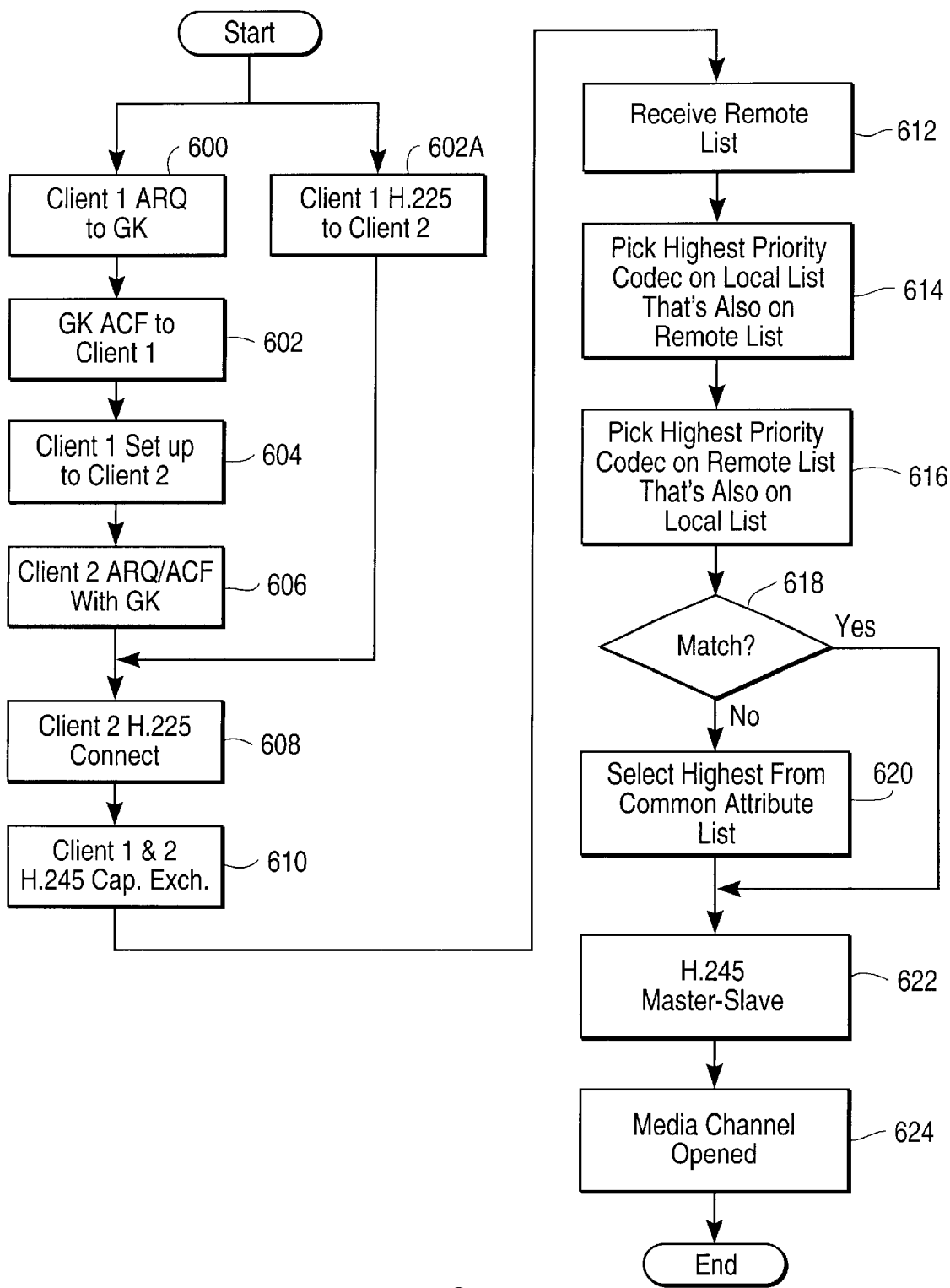
FIG. 6 is a flowchart illustrating operation of an embodiment of the invention.

A similar command sequence is used in an implementation employing the H.323 direct signaling model, as shown in FIG. 6. In a step 600, the endpoint Client 1 sends an ARQ message to the gatekeeper GK requesting that a call to endpoint Client 2 be allowed using a direct call model. In a step 602, the gatekeeper GK responds with an ACF message to the endpoint Client 1. The ACF message includes a Call Signaling Transport Channel Address of the endpoint Client 2. In a step 604, in response to the ACF message, endpoint Client 1 sends an H.225.0 Setup message directly to endpoint Client 2, In response to the setup message, in a step 606, the endpoint Client 2 conducts an ARQ/ACF exchange with the gatekeeper GK. Alternatively, the exchange of ARQ/ACF messages may be omitted. That is, a direct call may be established between the endpoints Clients 1 and 2 with no involvement of gatekeeper GK, In this scenario, steps 600–606 are omitted. That is, in a step 602A, the endpoint Client 1 sends an H.225.0 message directly to endpoint Client 2. This causes endpoint Client 2 to process the received H.225.0 Setup message in step 608. Next, in a step 608, the endpoint Client 2 sends an H.225.0 Connect message to the endpoint Client 1 to progress the call to a connect state In a step 610, the endpoint Clients 1 and 2 exchange H.245 terminal capability messages.

According to the present invention, the local client endpoint Client 1 receives the remote priority list, in a step 612. Endpoint Client 1 then accesses the local priority list and, in a step 614, determines the highest priority codec on the local list that is also on the remote list. In a step 616, endpoint Client 1 accesses the remote list and determines the highest priority codec on the remote list that is also on the local list. In step 618, endpoint Client 1 determines whether the codecs match. If so, call processing proceeds to step 622. If not, then in a step 620, endpoint Client 1 accesses the common attribute list to select the highest priority of the two codecs. A similar procedure is undertaken at endpoint Client 2.

In a step 622, the endpoints Client 1 and Client 2 exchange H.245 master-slave determination messages and any other needed H.245 messages. Finally, in a step 624, a media channel using the chosen codec is opened between the endpoints.

What is claimed is:

1. A telecommunications system, comprising:
   a packet switched network;
   one or more telephony endpoints coupled to said packet switched network, said one or more telephony endpoints configured to communicate using one or more coding algorithms;
   wherein at least one of said telephony endpoints includes a coding resources unit, said coding resources unit configured to maintain a local priority list, a remote priority list, and a common attribute list for selecting a codec for transmission.

2. A telecommunications system in accordance with claim 1, wherein said packet switched network is H.323 compatible.

3. A telecommunications system in accordance with claim 2, wherein said coding resources unit is configured to identify a highest priority codec on said local priority list that is also on said remote priority list.

4. A telecommunications system in accordance with claim 3, wherein said coding resources unit is configured to identify a highest priority codec on said remote priority list that is also on said local priority list.

5. A telecommunications system in accordance with claim 4, wherein said coding resources unit is configured to determine if said highest priority codecs are the same.

6. A telecommunications system in accordance with claim 5, wherein said coding resources unit is configured to use a first listed of said highest priority codecs from said common attribute list if said highest priority codecs are not the same.

7. A telecommunications method, comprising:
   receiving a remote priority list;
   identifying a first highest priority codec on a local priority list that is also on said remote priority list;
   identifying a second highest priority codec on said remote priority list that is also on said local priority list;
   determining whether said first and second codecs are the same;
   transmitting with said first and second codecs if said first and second codecs are the same; and
   selecting one of said first and second codecs from a common attribute list if said first and second codecs are not the same.

8. A telecommunications method according to claim 7, wherein said common attribute list orders said codecs according to bandwidth usage.

9. A telecommunications method according to claim 7, wherein said common attribute list orders said codecs according to voice quality.

10. A telecommunications device, comprising:
    a plurality of codecs, wherein said telecommunications device is adapted to communicate with other telecommunications devices using said plurality of codecs; and a coding resources unit for selecting one of said plurality of codecs for communicating, said coding resources unit configured to maintain a local priority list, a remote priority list, and a common attribute list for selecting a codec for transmission.

11. A telecommunications device in accordance with claim 10, wherein said coding resources unit is configured to identify a highest priority codec on said local priority list that is also on said remote priority list.

12. A telecommunications device in accordance with claim 11, wherein said coding resources unit is configured to identify a highest priority codec on said remote priority list that is also on said local priority list.

13. A telecommunications device in accordance with claim 12, wherein said coding resources unit is configured to determine if said highest priority codecs are the same.

14. A telecommunications device in accordance with claim 13, wherein said coding resources unit is configured to use a first listed of said highest priority codecs from said common attribute list if said highest priority codecs are not the same.

* * * * *